US005781380A

United States Patent [19]

Berding et al.

[11] Patent Number: 5,781,380
[45] Date of Patent: Jul. 14, 1998

[54] SWING-TYPE ACTUATOR ASSEMBLY HAVING INTERNAL CONDUCTORS

[75] Inventors: Keith R. Berding; Shawn E. Casey. both of San Jose; Charles B. Mountain. Irvine, all of Calif.

[73] Assignee: Western Digital Corporation. Irvine, Calif.

[21] Appl. No.: 831,986

[22] Filed: Apr. 1, 1997

[51] Int. Cl.[6] ........................................ G11B 5/48
[52] U.S. Cl. ............................................ 360/104
[58] Field of Search .............................. 360/104–106

[56] References Cited

U.S. PATENT DOCUMENTS

| | | | |
|---|---|---|---|
| 5,052,105 | 10/1991 | Mische et al. | 29/883 |
| 5,103,359 | 4/1992 | Marazzo | 360/104 |
| 5,422,764 | 6/1995 | McIlvanie | 360/97.01 |
| 5,491,597 | 2/1996 | Bennin et al. | 360/104 |
| 5,528,819 | 6/1996 | McKay | 360/103 |
| 5,606,477 | 2/1997 | Erpelding | 360/104 |
| 5,617,274 | 4/1997 | Ruiz | 360/104 |
| 5,644,448 | 7/1997 | Suzuki | 360/106 |
| 5,657,186 | 8/1997 | Kudo | 360/104 |
| 5,657,531 | 8/1997 | Sato | 360/104 |
| 5,663,854 | 9/1997 | Grill | 360/104 |
| 5,666,717 | 9/1997 | Matsumoto | 360/104 |
| 5,668,684 | 9/1997 | Palmer | 360/106 |

*Primary Examiner*—A. J. Heinz
*Attorney, Agent, or Firm*—Leo J. Young; W. Chris Kim; Milad G. Shara

[57] ABSTRACT

The invention relates to a magnetic disk drive having a head stack assembly including a rotary actuator body having a flex circuit mounting site for mounting a main actuator flex circuit and an arm extending therefrom which supports a head gimbal assembly (HGA). The invention provides for molding the conductors into the arm and the actuator body so that the conductors are strategically exposed along the flex circuit mounting side of the actuator body and along an end of the arm body which mates with the HGA.

28 Claims, 13 Drawing Sheets

SWING-TYPE ACTUATOR ASSEMBLY HAVING INTERNAL CONDUCTORS

BACKGROUND OF THE INVENTION

1. Field of the Invention

The invention relates to a magnetic disk drive ("disk drive") and more particularly to an improved swing-type actuator assembly within the disk drive having an actuator arm with internal, molded-in conductors for transmitting read and write signals without having to route external conductors along the actuator arm, to an actuator arm and load beam assembly that detachably connect to one another without swaging, and to a reworkable gimbal.

2. Description of the Related Art

A conventional disk drive has a head disk assembly ("HDA") including at least one magnetic disk ("disk"), a spindle motor for rapidly rotating the disk, and a head stack assembly ("HSA") that includes a transducer head ("head") for reading and writing data. The HSA is controllably positioned by a servo system in order to read or write information from or to particular tracks on the disk. The typical HSA has two primary portions: (1) an actuator assembly that moves in response to the servo control system and (2) a head gimbal assembly ("HGA") that extends from the actuator assembly and biases the head towards the disk. The typical HSA further includes a flex circuit on the side of the actuator body ("main actuator flex circuit"), and a plurality of individual insulated wires which connect conductors on the main actuator flex circuit to conductors on the head to transmit read and write signals to and from the head.

The industry presently prefers a "rotary" or "swing-type" actuator assembly which conventionally comprises an actuator body that rotates on a pivot assembly between limited positions, a coil that extends from one side of the actuator body to interact with a pair of permanent magnets to form a voice coil motor, and an actuator arm that extends from an opposite side of the actuator body to support the HGA.

The conventional HGA includes a suspension assembly comprising a load beam and a gimbal. The gimbal carries a slider which contains the head. The load beam has a spring function which provides a "gram load" biasing force and a hinge function which permits the head to follow the surface contour of the spinning disk. The load beam has an actuator end that connects to the actuator arm and a gimbal end that connects to the gimbal which carries the head and transmits the gram load biasing force to the head to "load" the head against the disk. A rapidly spinning disk develops a laminar air flow above its surface that lifts the head away from the disk in opposition to the gram load biasing force. The head is said to be "flying" over the disk when in this state.

The load beam is usually made of stainless steel and is usually swaged to the actuator arm assembly by ramming a ball through a hollow boss on the load beam that is held within a hole in the actuator arm. The swaging operation is relatively quick, but it can bend the suspension assembly, move the head out of its nominal position, and make the gram load biasing force either too high or too low. Because of this violent operation, the yield of acceptable HSA's may be reduced. Moreover, if it is determined that the completed HSA has a defective head gimbal assembly, it takes a considerable time and effort to "deswage" and then replace the defective assembly.

Another problem with the conventional HSA is that the insulated wires must be manually, painstakingly, installed along the actuator arm between the main actuator flex circuit and the head supported at the end of the head gimbal assembly. This too is an expensive, labor intensive activity during assembly or repair. The use of individual wires also detrimentally impacts HSA yield, a problem that will be exacerbated as the industry moves into smaller "pico" heads or head assemblies including magnetoresistive transducers, which require more than two wires. Other improvements may require even more leads.

At least one manufacturer has tried to simplify the electrical connections in the head stack assembly. Hutchinson Technology, Inc., for example, makes a so-called "trace suspension assembly" ("TSA"), which comprises a conventional load beam adapted for a swage connection which carries a special multilayer flexure having a stainless steel support layer covered by an insulating layer (polyimide) and a conductive layer (copper). A circuit is photochemically formed on the flexure to define conductive "traces" that replace the discrete wires conventionally employed to electrically connect to the head. The flexure may also be shaped to form a gimbal to mechanically carry the head.

A TSA may be made in various versions so far as its traces are concerned. In one version, the traces terminate at the side of the load beam near the swaging boss making it necessary, therefore, to connect the traces to the main actuator flex circuit with individual wires or with a long, thin flex circuit called an "interposer." In a second version, the traces continue along a "tail" that extends beyond the swaging boss and that has a pair of bends so that the traces lie in a vertical plane along the edge of the actuator arm and bond directly to the main actuator flex circuit using, for example, a solder connection or, in extremely demanding situations, an ultrasonic gold-gold bond. The interposer and tail both eliminate the use of individual wires, but they are relatively expensive because their small size and fine features make them difficult to manufacture. Moreover, they are so fragile that they are difficult to handle by hand or by machine, and are subject to damage from handling during manufacture, shipment, or assembly.

The gimbal in a conventional stainless steel HGA usually comprises a pair of flexible arms that extend from the load beam and are connected together by a cross member which defines an aperture between the flexible arms and supports a thin, flexible tongue that extends into the aperture. A TSA includes a gimbal comprising traces that are photochemically formed on a multilayer flexure that is attached to an underlying load beam. In either case, the gimbal is very fragile and may be damaged by being bent or torn during assembly. Unfortunately, however, the gimbals are an integral part of the HGA or TSA. Therefore, if the gimbal is bent or torn, then the entire HGA or TSA must be discarded.

Accordingly, there is a need in a disk drive for an improved swing-type actuator assembly with conductors that permit the actuator assembly and overall HSA to be manufactured with fully or partially automated equipment and easily reworked or repaired when necessary to reduce cost and enhance yield. There is also a need for a mechanical connection between the actuator assembly arm and the HGA that is rapid, secure, and removable. Finally, there is a need for an HGA with a reworkable gimbal.

SUMMARY OF INVENTION

An object of the present invention is to eliminate the need for a plurality of external conductors exposed along the arm of a swing-type actuator assembly by covering a portion of such conductors with the arm body and with the actuator body. The plurality of conductors may, for example, be inside of the arm body and actuator body so as to define an array of terminals along the side of the actuator body for connection to a main flex circuit, and to define a plurality of terminals exposed at the head gimbal end of the arms body for connection to conductors carried by the head gimbal assemblies and leading to a transducer head. As a result of this unique structure, it is unnecessary to externally route conductors along the arm body to connect conductors of a main flex circuit to conductors on the head gimbal assembly.

In a first aspect, the invention resides in a head stack assembly for a magnetic disk drive comprising an actuator body of the type having a pivot axis and an exterior surface defining a mounting site, a flex circuit cable having a portion thereof supported on the mounting site, a motive means for swinging the actuator body about the pivot axis, an arm cantilevered from the actuator body, and a head gimbal assembly cantilevered from the arm and including a head and an HGA electrical terminal electrically connected to the head. In further accordance with the invention, the arm comprises a molded arm body and a plurality of conductors, each conductor including a head-terminal end, a body-terminal end, and defining a conductive path extending between the head-terminal end and the body-terminal end. Significantly, the molded arm body includes a portion covering a section of the conductive path extending from the head-terminal end, and further includes means for electrically connecting the head-terminal end to the HGA electrical terminal and the actuator body includes a portion covering a section of the conductive path extending from the body-terminal end, the body-terminal end projecting from the mounting site of the actuator body and being electrically connected to the flex circuit cable.

In a second aspect, the invention resides in an overall, magnetic disk drive having a disk and a head stack assembly as described above.

In a third and fourth aspect, the invention resides in a method of making a head stack assembly for a magnetic disk drive which includes the steps of providing a flex circuit assembly, providing a head gimbal assembly, providing a plurality of conductors having a head-terminal end and a body-terminal end for electrically connecting the head gimbal assembly to the flex circuit assembly, molding an arm body over the plurality of conductors, electrically connecting the gimbal end of the plurality of conductors to the head gimbal assembly; and electrically connecting the body terminal end of the plurality of conductors to the flex circuit assembly. The foregoing method of manufacture may also be implemented by providing the plurality of conductors as a lead frame having a head-terminal end and a body-terminal end for electrically connecting the head gimbal assembly to the flex circuit assembly and then molding a lead frame island on the lead frame for supporting the lead frame. In alternative embodiments of the method, the island may be extended to a plurality of islands and may comprise a non-conductive material, and the arm body molding step may include molding a non-conductive skin over the islands. In still another embodiment of the invention, the arm body molding step may include molding a conductive skin over the island.

DETAILED DESCRIPTION OF THE PREFERRED EMBODIMENTS

Figure 1:
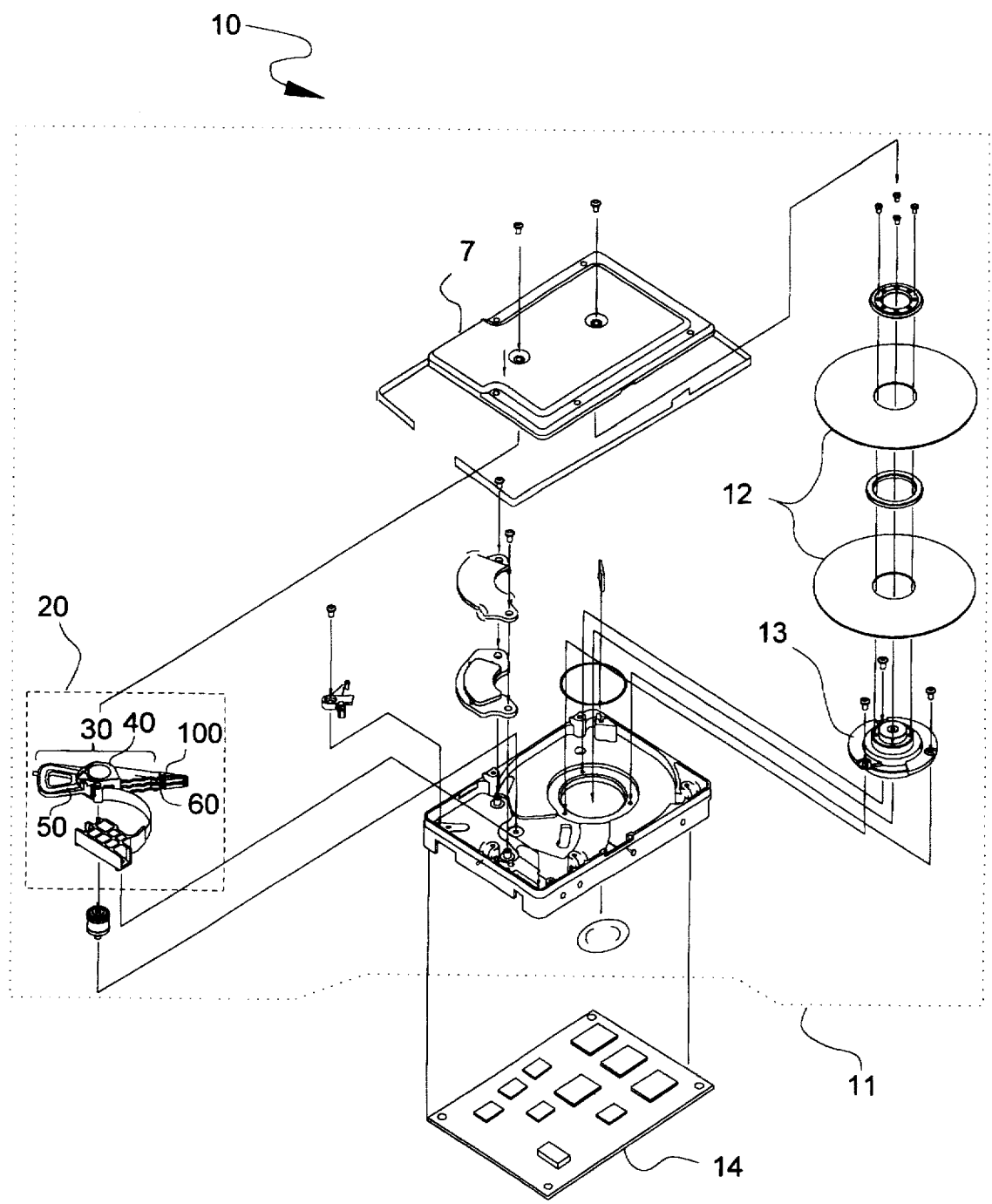
FIG. 1 is an exploded perspective view of a magnetic disk drive 10 having a head disk assembly 11 ("HDA") including a head stack assembly 20 ("HSA") having a first preferred actuator arm assembly 60 with internal, molded-in, conductors.

FIG. 1 shows the principal components of a disk drive 10 constructed in accordance with the present invention. The disk drive 10 shown is an integrated drive electronics (IDE) drive, comprising a head disk assembly (HDA) 11 and a controller circuit board 14.

The HDA 11 of FIG. 1 comprises a magnetic disk 12 (2 shown), a spindle motor 13 for rapidly rotating the disk 12, and a head stack assembly 20 located next to the disk 12. The head stack assembly 20 comprises a swing-type actuator assembly 30 and at least one head gimbal assembly 100. As shown more clearly in FIG. 5, each head gimbal assembly 100 comprises a load beam assembly 120, a gimbal 130 supported by the load beam assembly 120, and a head 140 supported by the gimbal 130. The actuator assembly 30 comprises a voice coil 50, an actuator body 40, and an actuator arm 60. The head stack assembly 20 is located so that the head 140 of the head gimbal assembly 100 is biased towards and moveable over the disk 12. The HDA's storage capacity may be increased, as shown in FIG. 1, by including several disks 12 and a head stack assembly 20 having a vertical "stack" of head gimbal assemblies 100 and associated heads 140 for each surface of each disk 12, the head gimbal assemblies 100 supported by multiple actuator arm 60.

As mentioned above, it is quite troublesome to make electrical connections with the HGA using individual wires, tails, or interposers. It is desirable, therefore, to provide a head stack assembly having embedded conductors that eliminate the need for such external conductors. It may be possible, of course, to mold individual wires into the head stack assembly, but it would present difficulties in handling and termination. Likewise, molding the tail or interposer into the head stack assembly is also difficult because of concerns for thickness tolerance, thermal concerns, costs and possible contamination. The inventors realized that apparently unrelated integrated circuit technology offered a preferred solution for connecting critical signals in the form of "lead frames" because of structural advantages for physical and electrical repeatability and ease of handling. A preferred embodiment, therefore, involves a head stack assembly having a plurality of lead frame conductors that are initially held rigidly within a lead frame carrier created from a sheet of material.

Figure 2:
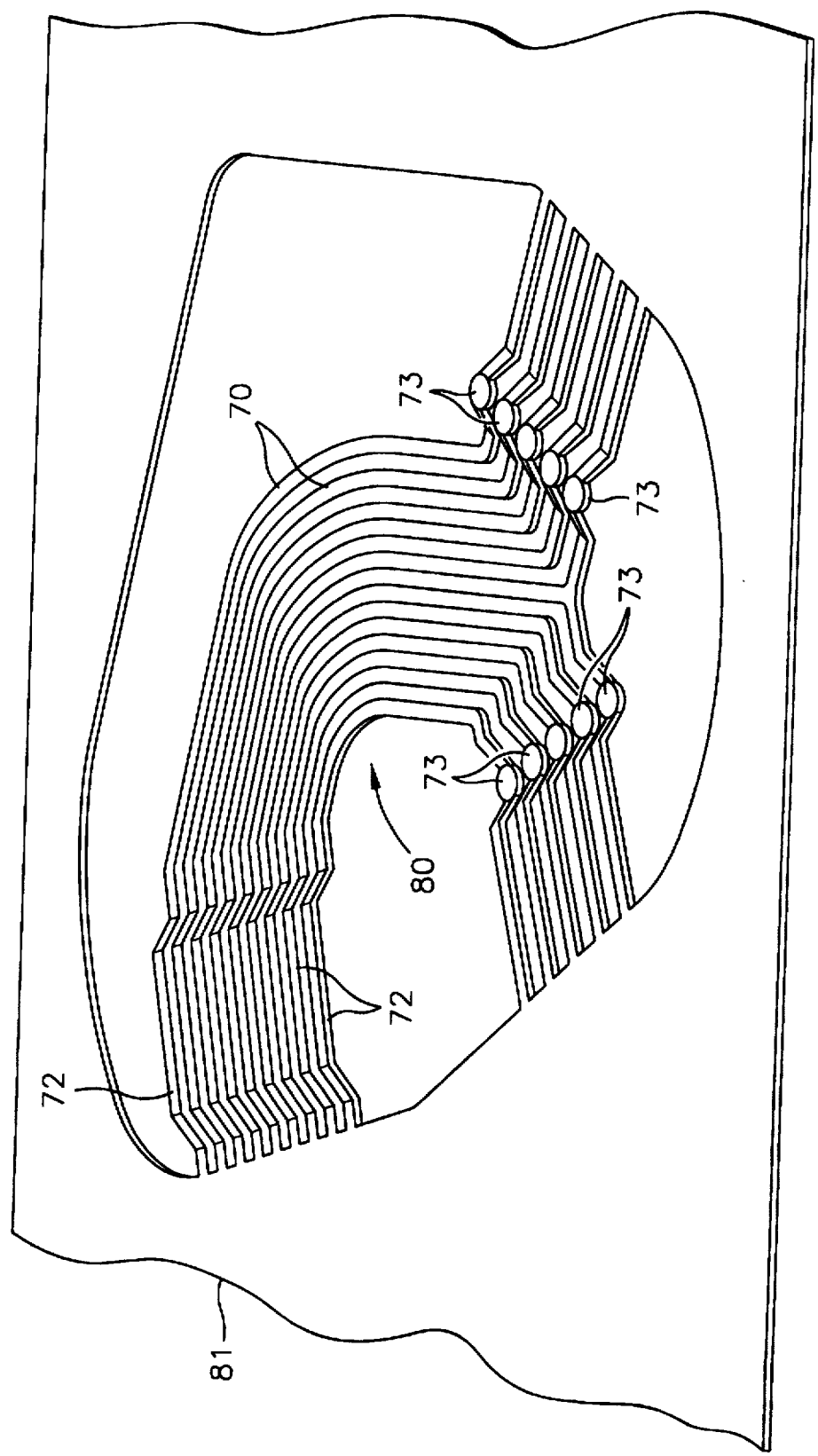
FIG. 2 shows a plurality of conductors 70 that are in the form of a lead frame 80 held within a carrier strip 81 and shaped to fit inside of an actuator arm 60.

FIGS. 2–5 illustrate a first preferred actuator arm 60 having internal conductors according to the present invention. FIG. 2 shows a plurality of conductors 70, a first portion of which will be molded inside the actuator body 40 of FIG. 5 and a second portion of which will be molded inside an arm body 61 of the actuator arm 60 of FIG. 5. The conductors 70 shown are in the form of a lead frame 80 held within a carrier strip 81, but other types of conductors are possible as discussed below.

Figure 5:
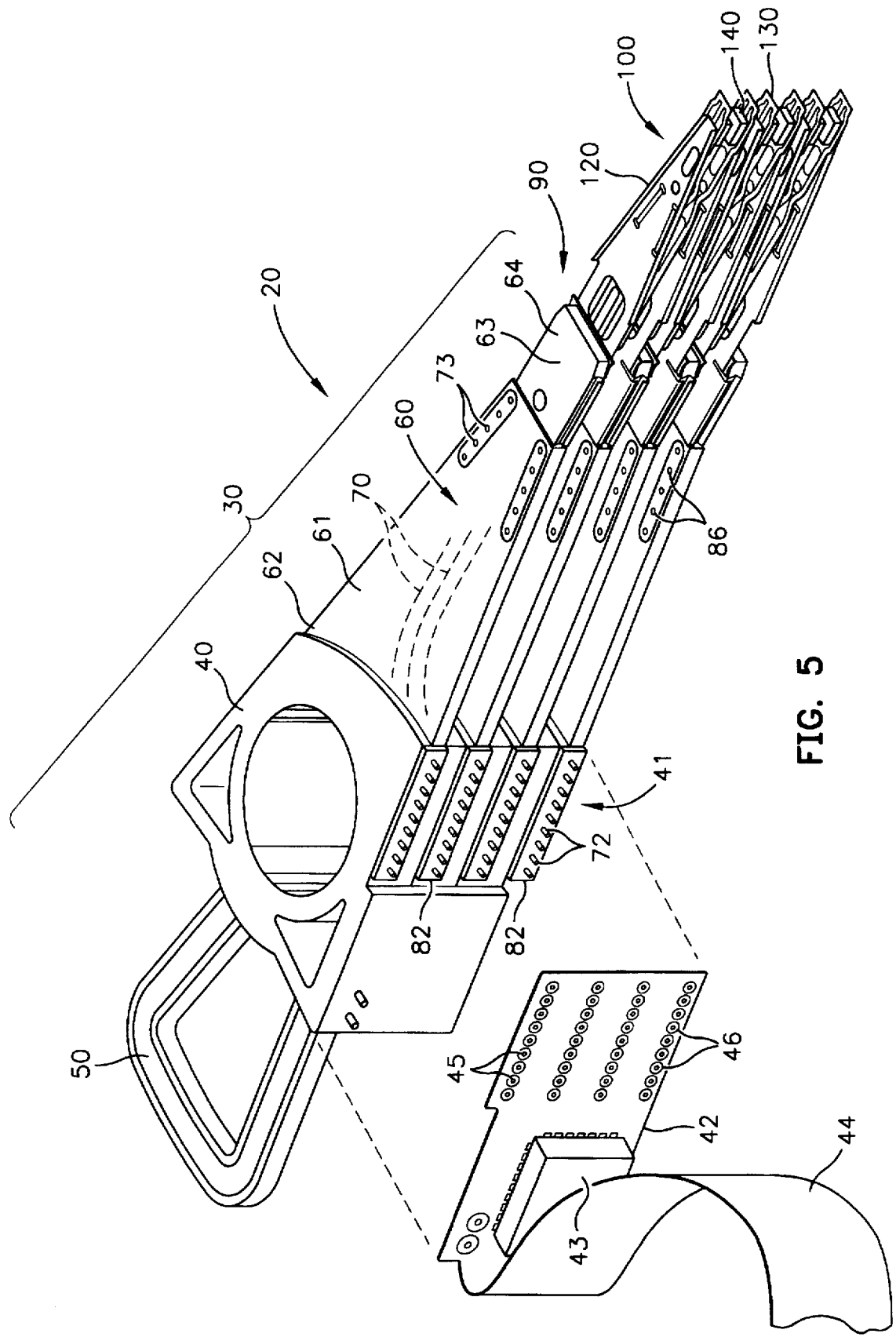
FIG. 5 is a perspective view of a first preferred head stack assembly 20 which includes a first preferred actuator arm 60 that contains the plurality of conductors 70 of FIGS. 2–4 and detachably supports a first preferred head gimbal assembly 100 at a head gimbal end 63 thereof.

Returning to FIG. 2, it can be seen that the lead frame 80 has been etched or die cut and stamped to define a plurality of conductors 70 with a corresponding plurality of body terminals 72 at a body terminal end and head terminals 73 at a head terminal end. In this embodiment, the head terminals 73 are separated into upper and lower sets that will be positioned to either side of the actuator arm 60 as shown in FIG. 5. The two sets of head terminals 73, however, could take on another form such as pins, could be arranged in other geometries, and could even be defined by first and second lead frames that are separate from one another (not shown).

Figure 3:
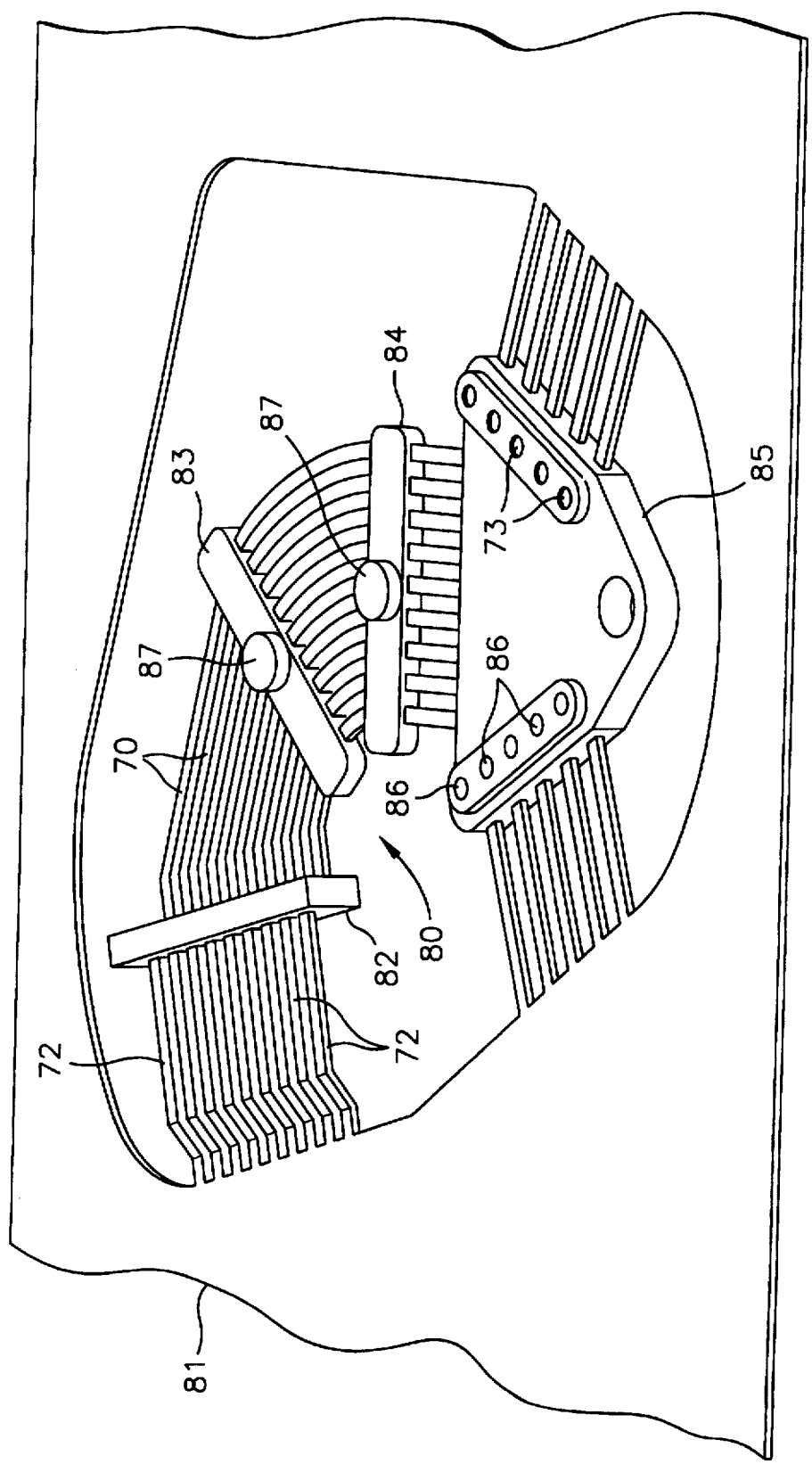
FIG. 3 shows a plurality of alignment islands 82, 83, 84, 85 molded onto the plurality of conductors 70 of FIG. 2 to hold them in position during a subsequent molding operation.

As shown in FIG. 3, several retention islands 82, 83, 84, 85 may be molded onto the lead frame 80 in order to help position the conductors 70 and the terminals 72, 73 prior to and during subsequent molding processes. The intermediate islands 83, 84, may, for example, include upstanding alignment bosses 87 that are captured by corresponding apertures within the actuator arm molding cavity. It can also be seen that the topside of the island 85 containing the head gimbal terminals 73 (hereinafter the "pad island") has five terminals 73 on the upper right side and five core pin holes 86 leading to five terminal 73 on the lower side. The converse of this arrangement holds true on the underside of the pad island 85. The core pin holes 86 are simply artifacts of core pins (not shown) used to press the head terminals 73 against the mold cavity during the molding process so that the plastic does not flash over the terminals and they remain exposed after the assembly is ejected from the mold.

Figure 4:
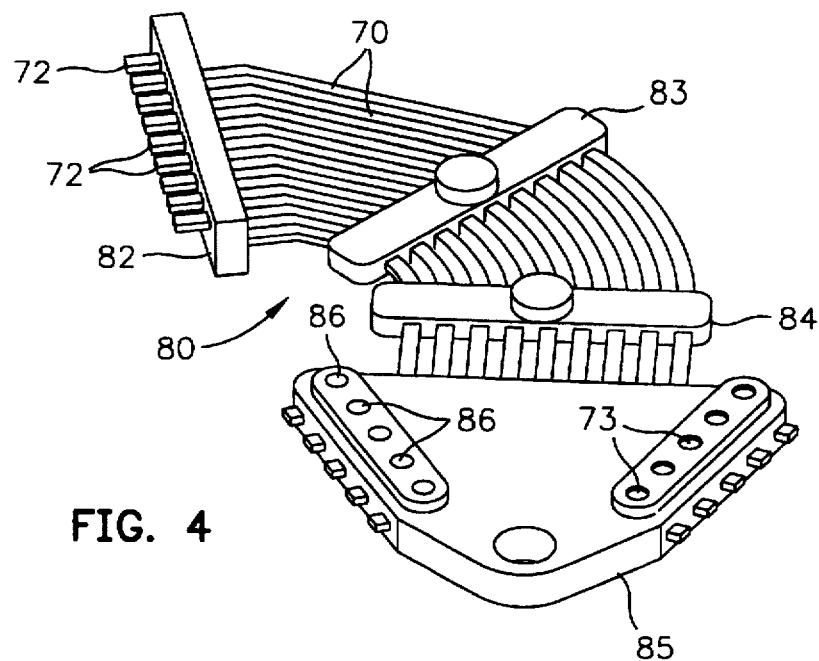
FIG. 4 shows the plurality of conductors 70 and alignment islands 82, 83, 84, 85 after being detached from the carrier strip 81.

In FIG. 4, the lead frame 80 and alignment islands 82, 83, 84, 85 have been detached ("detabbed") from the carrier strip 81, whereby the entire assembly is ready to be molded inside of an actuator arm 60. The islands must be nonconductive. Accordingly, it is also possible to completely encapsulate the conductors in a single island, and then mold the entire assembly inside of a conductive arm body and use the arm body for a ground/shield.

The islands 82, 83, 84, 85 are preferably made in a transfer molding process using a thermoset plastic that can be injected at lower pressures and hardened through application of heat, so that the islands can withstand the heat of subsequent molding. It may be possible to injection mold the islands at high pressure in order to decrease the molding cycle time, but it would be necessary to identify a plastic that can withstand the higher temperature of subsequent molding steps. The presently preferred islands 82, 83, 84, 85 comprise an epoxy material or a phenolic material and the presently preferred actuator arm 60 comprises injection molded 40% glass-filled Polyphenylene Sulfide (PPS). PPS may be filled with carbon, rather than glass, to form an actuator arm 60 with a conductive exterior.

In an alternative embodiment, the islands 82, 83, 84, 85 may be replaced with a single overall island covering the conductors 70 along most of their length with a nonconductive plastic. The conductors and single island could then be covered by a conductive plastic skin made of carbon-filled Polyphenylene Sulfide (PPS), for example, so that static electricity can more readily be removed from the arms. The inventors contemplate grounding the conductive skin to an end of a particular one or ones of the conductors 70 used to ground the transducer head by leaving it exposed at an end portion of the overall non-conductive island so that the conductive skin makes contact with such conductor.

FIG. 5 shows a complete head stack assembly 20 which contains several actuator arms 60 having internal conductors 70. The HSA 20 preferably has an actuator assembly 30 that is an integrally molded structure wherein the voice coil 50 and the several actuator arms 60 are simultaneously formed with the actuator body 40. In such case, the voice coil 50 and several lead frames 80 are inserted into and held within a single, complex mold cavity. The voice coil 50 and individual actuator arms 60, however, may be pre-formed subassemblies that are insert molded into the actuator body 40. The specifics of the molding processes are well known in the art and omitted here for brevity.

As shown in FIG. 5, each actuator arm 60 contains the plurality of conductors 70, but the body terminals 72 are exposed to one side at an actuator body end 62 of the actuator arm 60 (and ultimately along a mounting site 41 on the side of the actuator body 40) and the head terminals 73 are exposed at a head gimbal end 63 of the actuator arm 60.

As shown in FIG. 1, and in more detail in FIG. 5, a flex circuit cable or main actuator flex circuit 42 connects to the mounting site 41 on the actuator assembly 30 of the HSA 20. The main actuator flex circuit 42 generally carries a preamplifier chip 43 and is integral with or connects to a service loop 44 so that the actuator assembly 30 may freely move and communicate read and write signals between the controller circuit 14 and the heads 140. The main actuator flex circuit 42 further comprises an array of through holes 45 and surrounding copper traces 46 which spatially coordinate with the array of body terminals 72 created by the adjacent plurality of actuator arms 60 molded into the actuator body 40. The copper traces of the main actuator flex circuit 42 may be easily attached to the body terminals 72 with ordinary solder connections using known techniques. These solder connections may also serve to mechanically connect the main actuator flex circuit 42 to the actuator body 40, but an adhesive may also be used. It is possible, of course, to make other types of electrical connections between a main actuator flex circuit 42 and body terminals 72 having different geometries. In addition, the main actuator circuit 42, may be replaced with a rigid printed circuit board that makes a solderless, press-fit connection with the body terminals 72 using press-fit pin geometries known in the art.

Finally, one or two head gimbal assemblies 100 are attached to the head gimbal end 63 of each actuator arm 60 having internal conductors 70. An HGA with an ordinary swage connection may be used with a head stack assembly having internal conductors as described above. The swaged connection is not generally desirable however, because it is so violent that it may bend or otherwise distort the HGA and, moreover, is semi-permanent, making it difficult to remove and replace a damaged or defective HGA. The de-swaging operation always destroys the HGA and may damage the actuator arm 60. The invention, however, uniquely provides a press-fit, head gimbal connecting means 90 for nondestructively and detachably connecting the head gimbal assembly 100 to the actuator arm 60.

Figure 6:
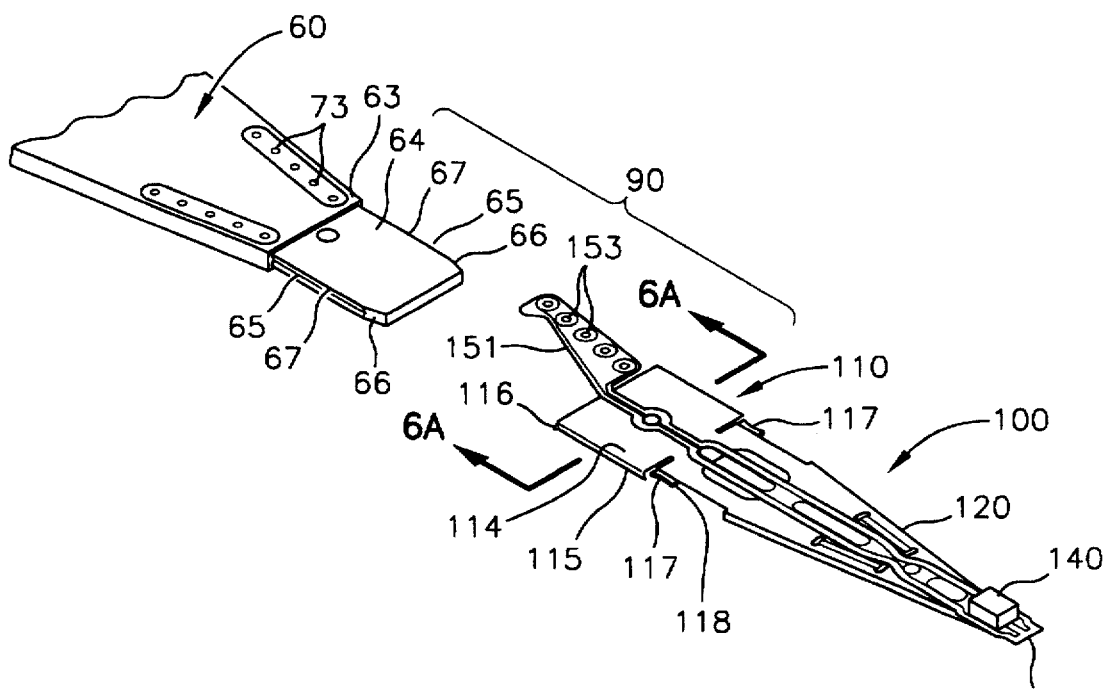
FIG. 6 is an exploded perspective view of a first preferred connecting means 90 comprising a protruding tab 64 located at a head gimbal end 63 of the first preferred actuator arm 60 and a base portion 110 of a first preferred head gimbal assembly 100.

FIG. 6 shows a first preferred head gimbal connecting means 90 for use with a first preferred head gimbal assembly 100 that is formed from sheet metal. The head gimbal assembly 100 may be a TSA that has been modified, as shown, in accordance with the present invention. The first preferred head gimbal connecting means 90 generally comprises a protruding tab 64 located at the head gimbal end 63 of the actuator arm 60 and a special base portion 110 located at the near end of the head gimbal assembly 100. A T-shaped base plate 118 is preferably secured beneath the special base portion 110 to prevent it from being deformed during assembly and to rigidly support the load beam 120 that extends from the actuator arm 60. A pair of gripping forks 117 are preferably included in the T-shaped base plate 118 for handling the head gimbal assembly 100 and to provide for partial or fully automatic assembly.

Figure 6A:
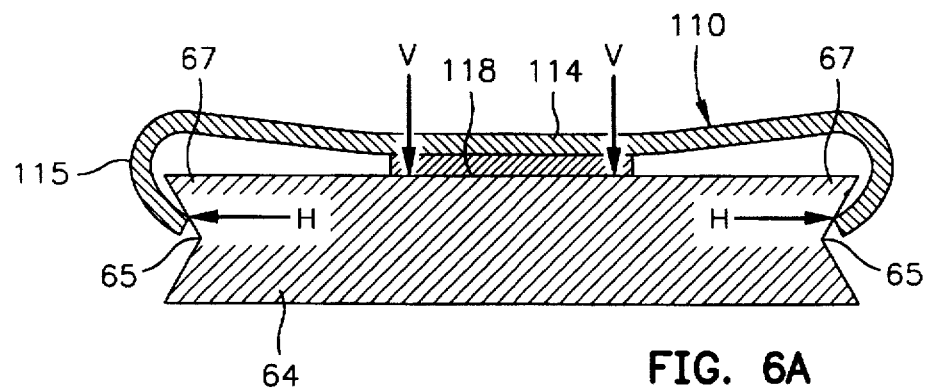
FIG. 6A is a cross-sectional view taken along section lines 6A—6A of FIG. 6 showing the connection between the protruding tab 64 and the base portion 110.

As shown in FIGS. 6 and 6A, the base portion 110 has a central cupped section 114 that flexibly supports a pair of rails 115. A groove 65 is located on each side of the protruding tab 64 to define flanges 67 that receive corresponding rails 115 on each side of the base portion 110. The central cupped section 114 and the rails 115 are formed from sheet metal to serve as flexible springs that tightly squeeze the protruding tab 64 both horizontally (arrows "H") and vertically (arrows "V") to secure and align the HGA 100 to the actuator arm assembly 60. The preferred connecting means 90 further comprises flared corners 116 on the base portion 110 and beveled corners 66 on the protruding tab 64 to help align the components for rapid press-on assembly.

As shown in FIG. 6, the base portion 110 is preferably formed from the same stock as the load beam assembly 120. The base portion 110 is simply etched out and formed. Although the base plate 118 is welded to the base portion 110, it is not necessary to weld or otherwise affix the base portion 110 to the remainder of the HGA 100, each HGA having its own base portion 110.

Figure 7:
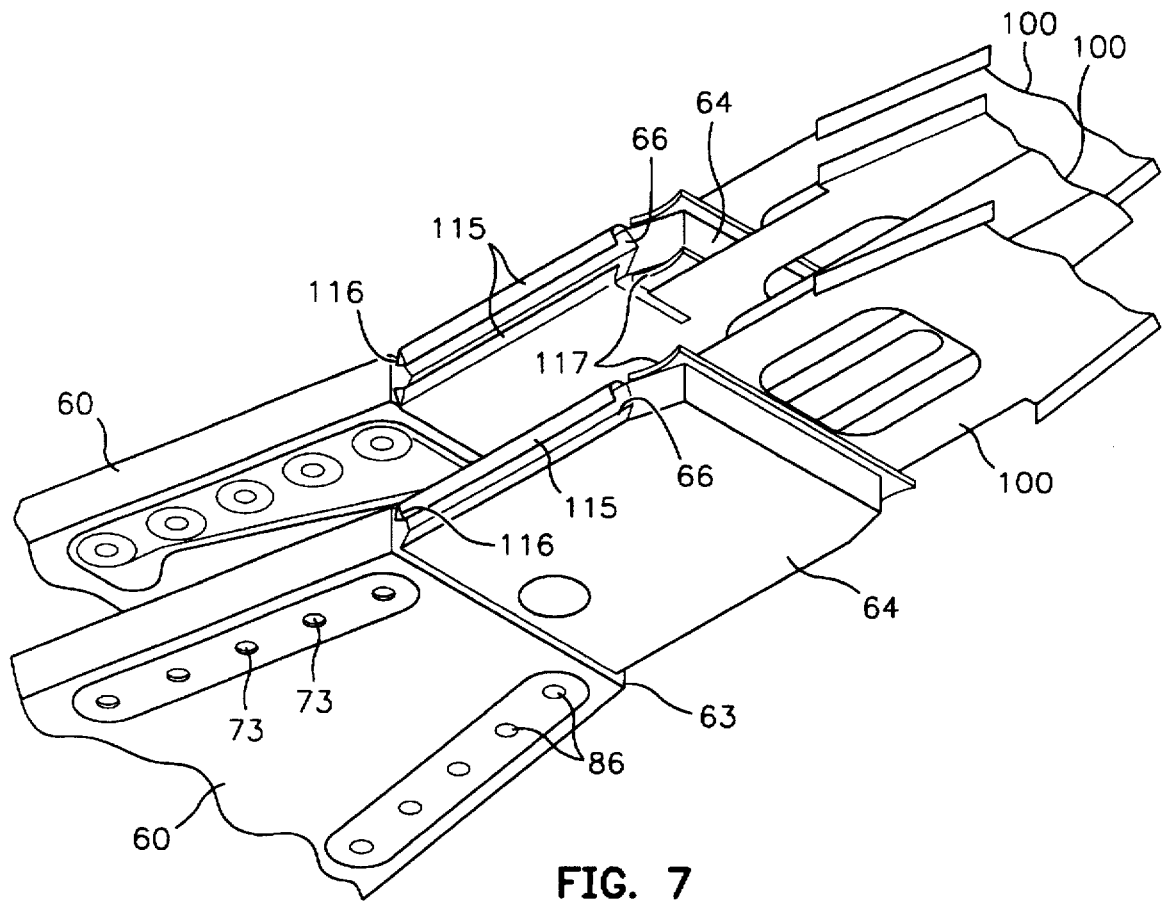
FIG. 7 is a close-up perspective view of the underside of the head gimbal end 63 of a lowermost actuator arm 60 with one of the first preferred head gimbal assemblies 100 attached thereto and of the head gimbal end 63 of an adjacent actuator arm 60 with two of the first preferred head gimbal assemblies 100, 100 attached thereto.

The first preferred actuator arms 60 are identical to one another, each having part of a head gimbal connecting means 90 for connecting to upper and lower HGA's 100. FIG. 7, for example, shows the detailed connection between a lowermost actuator arm 60 and one upper head gimbal assembly 100 and between an adjacent actuator arm 60 and two (upper and lower) head gimbal assemblies 100, 100. The head terminals 73 on the bottom of the lowermost actuator arm 60 and corresponding actuator body terminals 72 (not shown) are simply unused because no downward facing, head gimbal assembly 100 is present.

The first preferred HGA 100 includes an HGA electric terminal comprising a conductive extension 151 with an array of copper pads 153 which, as can be appreciated from FIG. 6, align with the array of head terminals 73 present at the head gimbal end 63 of the actuator arm 60. The copper pads 153 are preferably domed or "bumped" downward to help ensure they make contact with the head terminals 73. As compared to the "tail" in a conventional TSA, the conductive extension 151 is less likely to be damaged during handling or assembly because it is shorter, and most significantly, because it is not bent to change its orientation and it does not extend along the outside of an actuator arm to reach and connect to the main actuator flex circuit 42. In addition, the swaging boss and hole are preferably replaced with the first preferred head gimbal connecting means 90 of the present invention. In such case, the electromechanical connection of the HGA 100 to the actuator arm 60 is a rapid, two step process: (1) press fit the HGA 100 onto the actuator arm 60; and (2) connect the bumped copper pads 153 to the head terminals 73 using a hot bar solder reflow process or some other desired means well known in the art.

Figure 8:
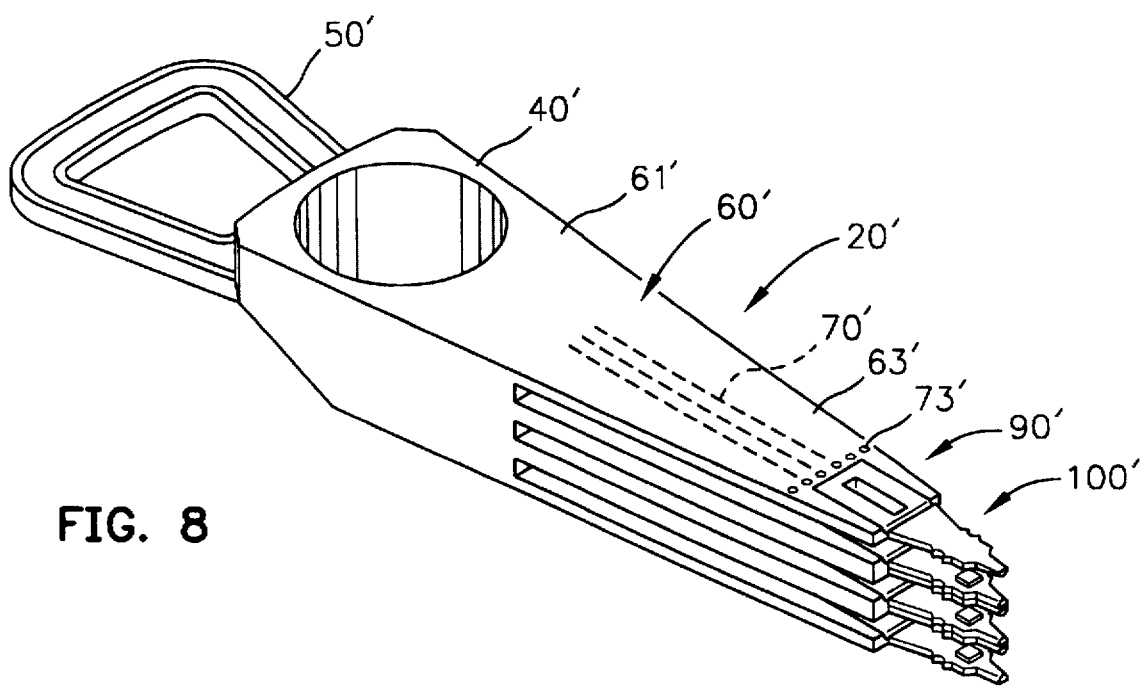
FIG. 8 is a perspective view of a second preferred head stack assembly 20' which comprises a second preferred actuator arm 60' that contains a second plurality of internal conductors 70' and which detachably supports a second preferred head gimbal assembly 100'.
Figure 10:
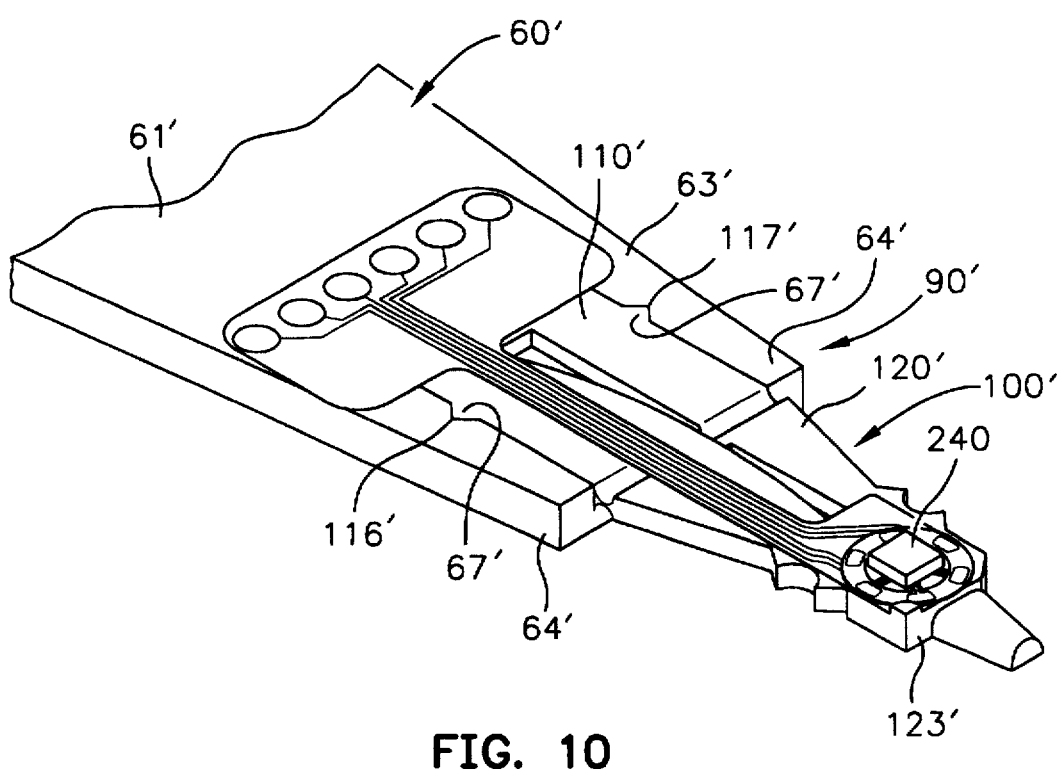
FIG. 10 is a perspective view of the head gimbal end 63' of a lowermost actuator arm 60' with a second preferred head gimbal assembly 100' attached thereto.
Figure 9:
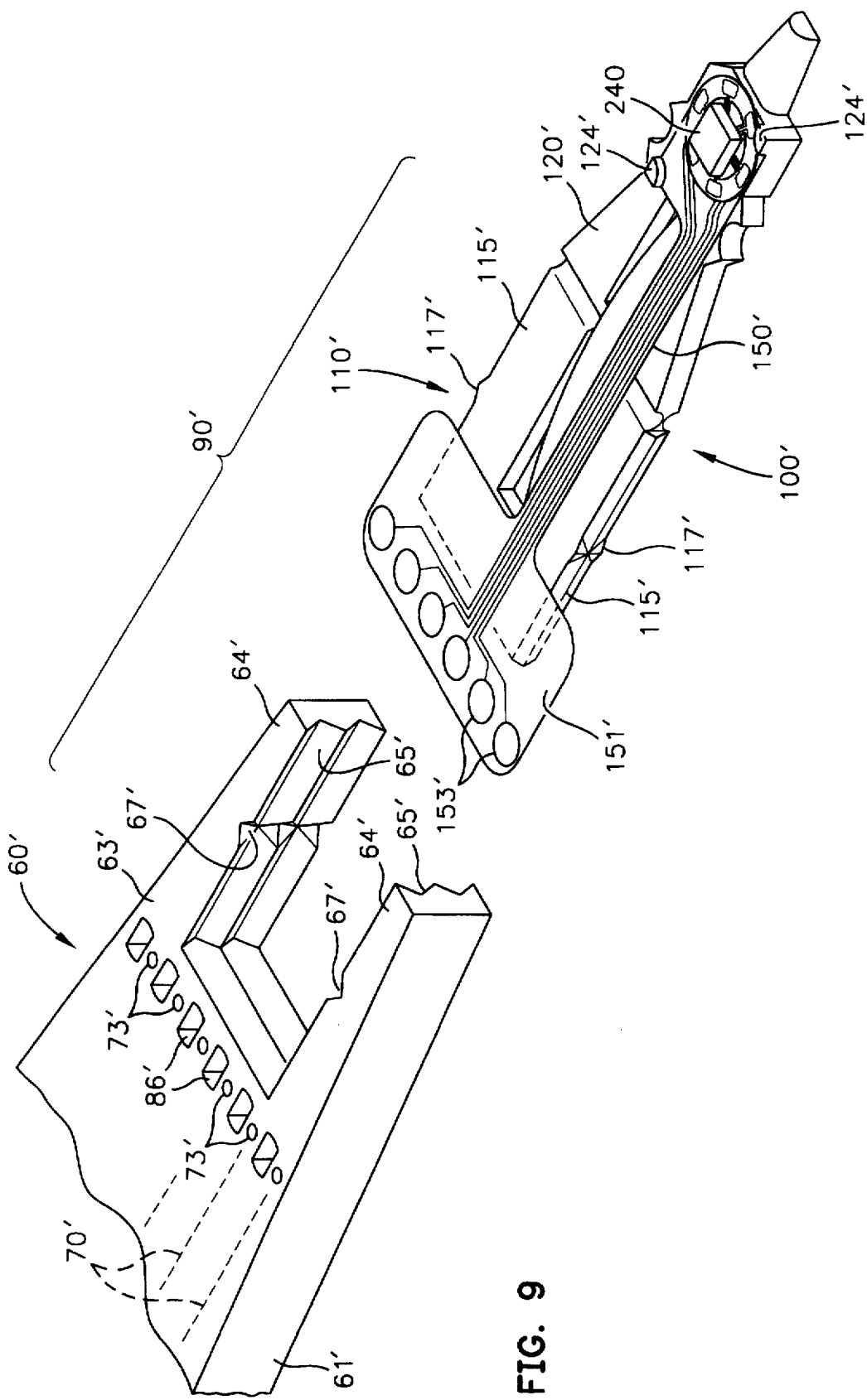
FIG. 9 is an exploded perspective view of a second preferred connecting means 90' comprising two fingers 64' located at a head gimbal end 63' of the second preferred actuator arm 60' and a base portion 110' of a second preferred head gimbal assembly 100'.

FIGS. 8-10 illustrate a second preferred head stack assembly 20' based on a second preferred actuator arm 60' and head gimbal assembly 100'.

Comparing FIGS. 8 and 5, it can be seen that second preferred head stack assembly 20' also has an actuator arm 60' with internal conductors 70' molded into arm body 61' and, comparing FIGS. 9 and 6, it can be seen that the second head stack assembly 20' includes a second head gimbal connecting means 90' for detachably connecting to the second preferred head gimbal assembly 100' in a press fit manner. In this case, however, the second preferred head gimbal assembly 100' is a molded component like the actuator arm 60'.

The second preferred HSA 20' comprises several actuator arms 60' which have been molded together with an actuator body 40' and a coil 50'. These components can be assembled in the same manner as in the first embodiment of FIG. 5. It should be noted from FIG. 8, however, that one variety of actuator arm 60' supports only one head gimbal assembly 100' while another variety supports two head gimbal assemblies 100'. This option may be desirable over identical arms (as in FIG. 5) in order to eliminate unused conductors and provide a lower profile head stack assembly 20'.

FIG. 9 is an exploded perspective view which illustrates the second preferred head gimbal connecting means 90' which connects the second preferred head gimbal assembly 100' to the second preferred actuator arm 60' (the top side of an internal actuator arm in this case). FIG. 10 shows the interconnection between a lowermost actuator arm 60' and one head gimbal assembly 100'. As shown in FIGS. 9 and 10, the second preferred head gimbal connecting means 90' generally comprises two tabs 64' which extend from the head gimbal end 63' of the actuator arm 60'. A V-shaped groove 65' is located on each tab 64' in a facing relationship to receive complimentary, V-shaped rails 115' on either side of the base portion 110' of the head gimbal assembly 100'. The tabs 64', as shown in FIG. 9, can carry two pairs of V-grooves 65 to carry two HGA's 100', an upper one and a lower one. A notch 67' and a cooperating detent 117' are preferably provided on each tab 65' and each rail 115' respectively, to secure the head gimbal assembly 100' to the actuator arm 60'.

The second preferred HGA 100' offers several distinct advantages as specified in more detail in an application entitled IMPROVED LOAD BEAM ASSEMBLY WITH SEPARATE SPRING AN HINGE FUNCTIONS filed concurrently with the present application. Because it is a molded plastic assembly, it can carry molded features that provide for a unique operation and simplify assembly including, for example, the rails 115' and detent 117' mentioned above.

As with the first assembly, internal conductors 70' are exposed at the head gimbal end 63' of the actuator arm 60' to define head terminals 73'. In FIG. 9, the head terminals 73' and core pin holes 86' alternate across the top of actuator arm 60', the bottom side being a mirror image of the top. The head terminals 73', however, could be arranged on opposite sides of the arm 60', with one set facing up and one facing down as shown in FIGS. 2–5, in order to simplify the placement of core pins in the molding cavity.

The second preferred HGA 100' carries a conductive load beam circuit which may be internal or external, but preferably comprise a head gimbal flex circuit 150' having a conductive extension 151' and conductive pads 153' that are somewhat like the conductive extension 150 and conductive pads 153 of the first HGA 100 shown in FIG. 6. The flex circuit 150', however, is a separate component that is attached to the remainder of the HGA 100' using, for example, an adhesive and plastic alignment bosses 124' formed during the molding process.

Figure 11:
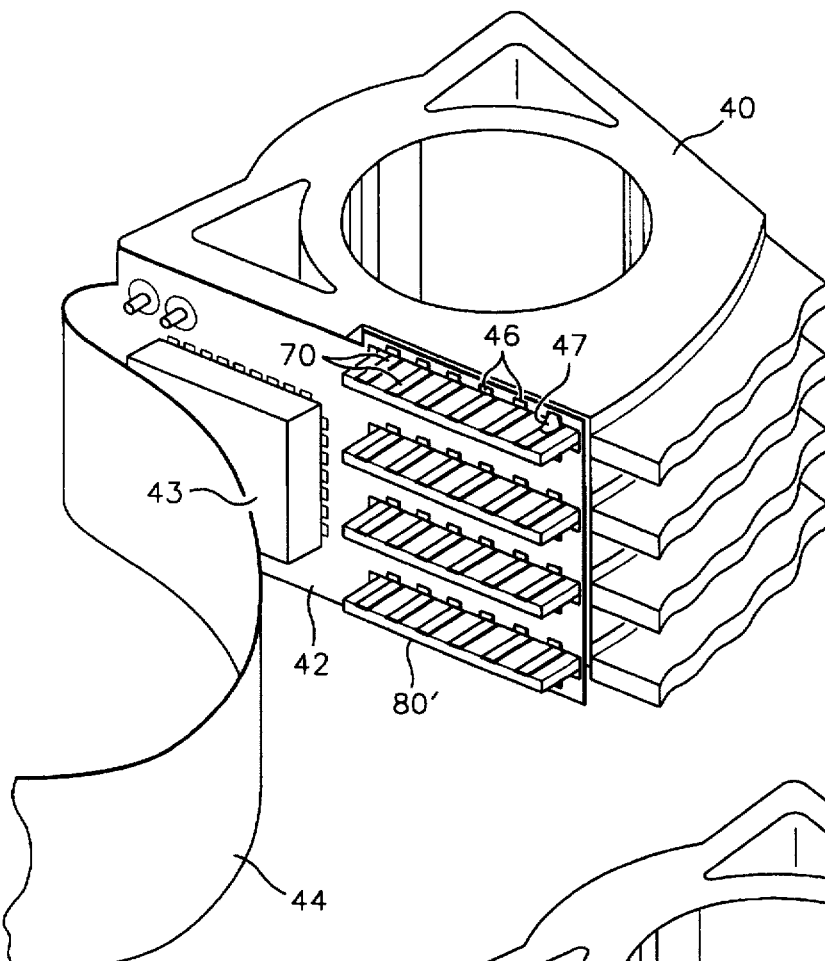
FIG. 11 shows the plurality of conductors 70 carried directly on a rigid substrate such as a printed circuit board 80'.
Figure 12:
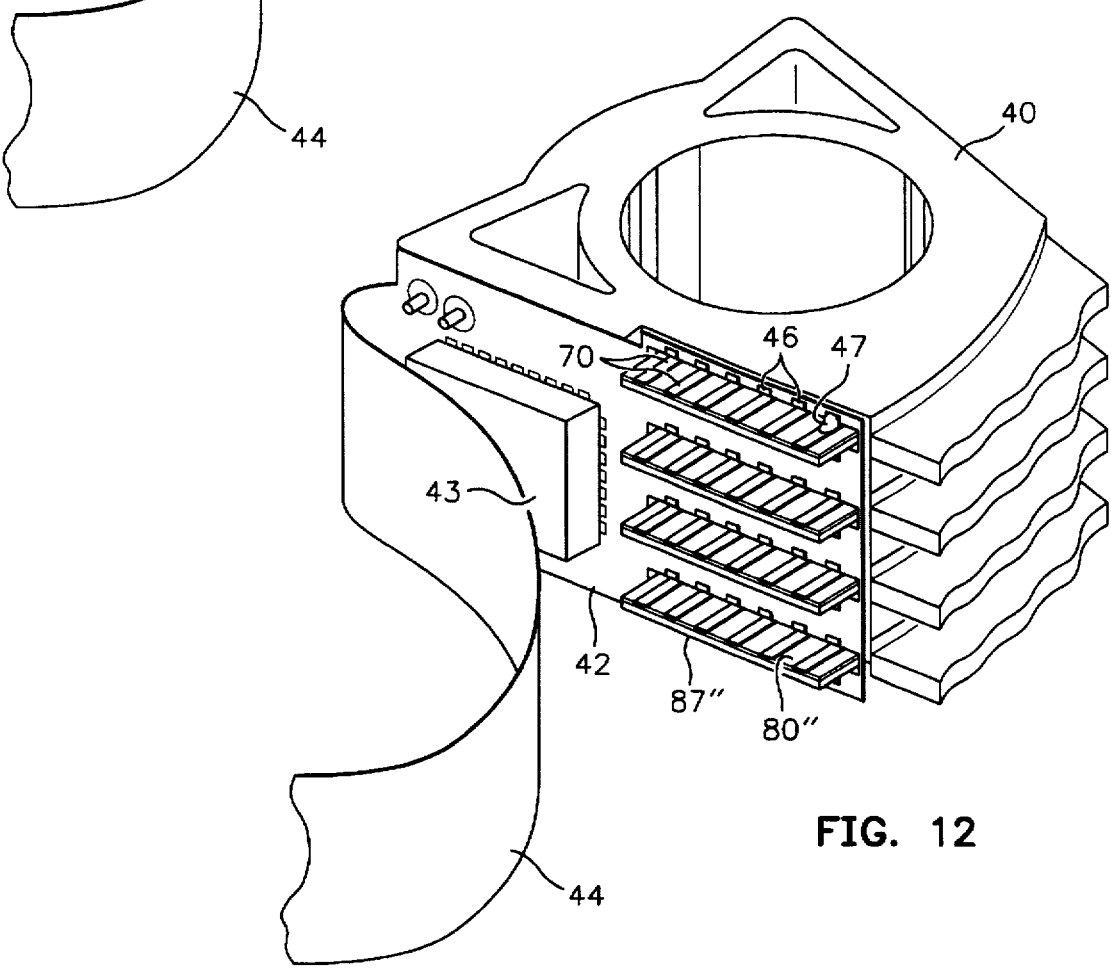
FIG. 12 shows the plurality of conductors 70 carried on a flexible substrate such as a polyimide sheet 80" which is optionally carried by a rigid substrate 87"

Many other arrangements may be used to form the plurality of conductors 70 molded into the actuator arm 60. As shown in FIG. 11, for example, the conductors 70 could be formed on a rigid substrate such as a printed circuit board 80' that is molded inside and extends from the actuator arm 60 and connects to traces 46 on the main actuator flex circuit 42 using, for example, an ordinary, right angle solder joint 47. As shown in FIG. 12, the conductors 70 could also be formed on a flexible substrate such as a polyimide sheet 80". It is also possible, of course, to mount the polyimide sheet 80" on a rigid substrate 87", as shown, before molding the actuator arm 60.

Figure 13:
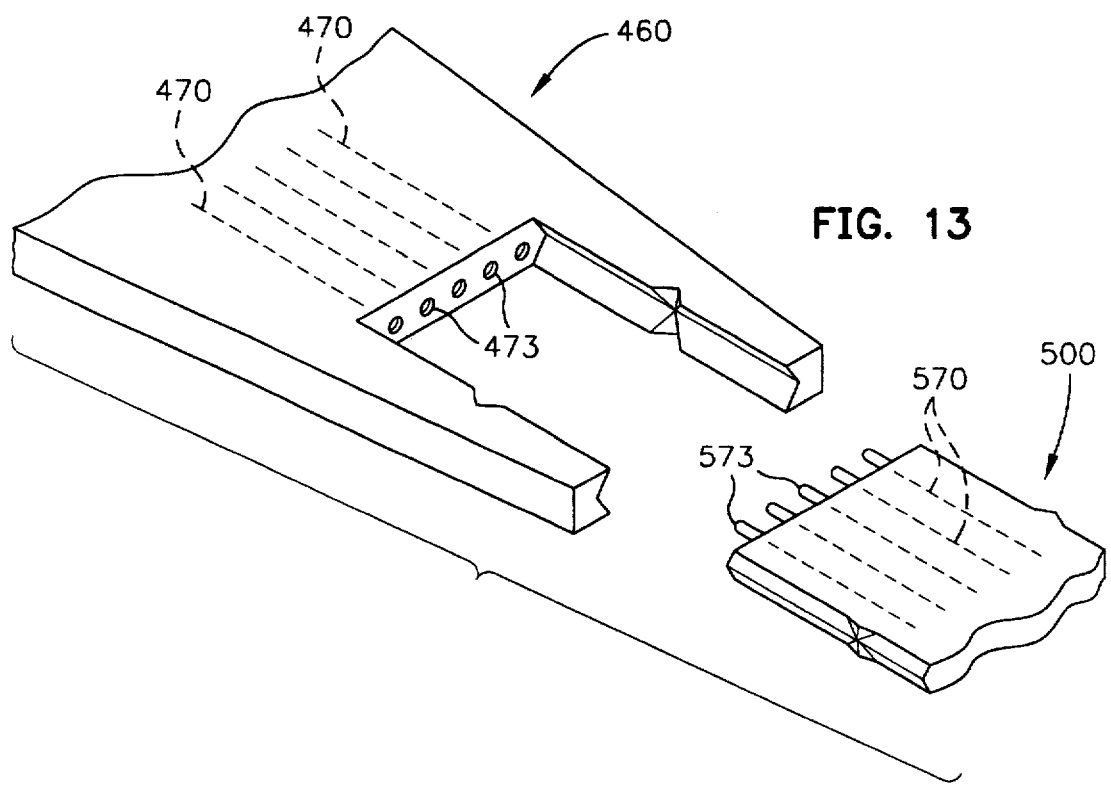
FIG. 13 shows a third alternative actuator arm assembly 460 and head gimbal assembly 500 which incorporate the second preferred connecting means of FIG. 9, both having internal conductors 470, 570 and corresponding terminals 473, 573 that automatically connect to one another in a plug-like fashion.

As shown in FIG. 13, a third preferred HGA 500 may contain its own internal conductors 570 that connect directly to the conductors 470 in a third preferred actuator arm 460. In this embodiment, the HGA's internal conductors 570 automatically mate with the actuator arm assembly's internal conductors 470 in a solderless, plug-like fashion as the HGA 500 is connected to the actuator arm 460. For example, the actuator arm assembly's head terminals 473 may be provided as female sockets and the HGA 500 may have male plug terminals 573, or vice versa. This would greatly improve the handling characteristics by completely eliminating the conductive extensions 150, 153', required by the embodiments of FIGS. 6 and 9, and would permit even faster assembly and repair.

Figure 14:
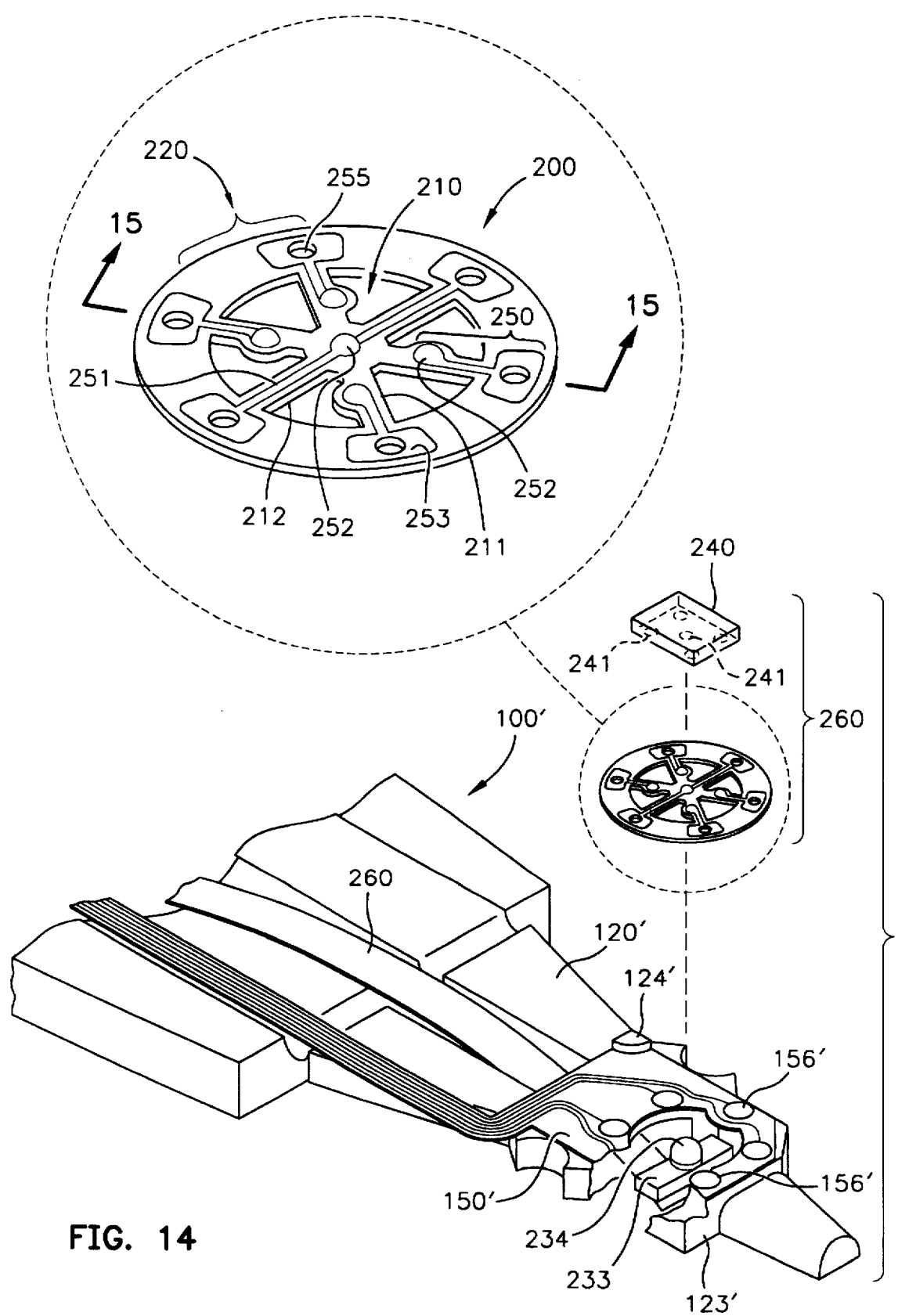
FIG. 14 is an exploded and partial cutaway perspective view which shows the construction of a first preferred gimbal 200 for use with a planar transducer head 240 and having an internal transducer support surface 210 and an outer band 220 according to the present invention.

FIG. 14 shows a first preferred gimbal 200 that is uniquely reworkable in accordance with the present invention. As shown therein, a transducer head 240 of the planar type is connected to the gimbal 200 to form a head-gimbal assembly 260 which is then connected to a head gimbal flex circuit 150' at a distal end of the load beam 120' to form the overall HGA 100'. The head-gimbal assembly 260 is shown with the second preferred HGA 100' (see FIG. 9) which uses a separate spring member 260 that bears against a cross member 233 and a load point 234 to bias the head 240 against the disk. The principles associated with the head-gimbal assembly 260 of the present invention, however, can be used with an HGA of most any construction.

TSA's have successfully used conductive traces formed on a flexure secured to an underlying load beam to form a gimbal and provide an electrical interconnect to the head, but the conductive traces detrimentally extend continuously from an actuator end of the TSA to the gimbal at the gimbal end of the TSA that supports the head. In a conventional HGA, the flexure/gimbal is welded to the load beam. In either case, the gimbal is delicate and more easily damaged as compared with the remainder of the HGA and the head itself. Accordingly, if the gimbal is bent or torn, then the entire suspension must be discarded.

The head-gimbal assembly 260 of FIG. 14, however, can be easily replaced without having to discard the remainder of the HGA 100'. This is made possible by a unique gimbal 200 which comprises an inner transducer support surface 210 that electromechanically carries the transducer head 240 and an outer band 220 which surrounds and supports the transducer support surface 210. The outer band 220, moreover, mates with suspension terminals 153' that are carried by the head gimbal flex circuit 150' that was previously attached to the load beam 120' and are located at a head gimbal end 123' of the load beam 120'. As a result of this unique structure, the head 240 may first be attached to the gimbal 200 and the resulting head-gimbal assembly 260 may then be releasably secured to the suspension terminals 153' by way of the outer band 220 with reflowable solder connections. Significantly, the head 240 and gimbal 200 collectively form a compact head-gimbal assembly 260 that is less likely to be damaged by handling, thereby increasing the overall manufacturing yield.

The preferred gimbal 200 is formed as a conventional flex circuit from a sheet having a polyimide layer and a copper layer. The preferred gimbal 200 comprises several flexible members 211, 212 which carry a conductive means 250 for connecting a plurality of transducer head terminals 241 to the suspension terminals 153'. A gimbal of any desired construction, however, may be contained in the gimbal 200 of the present invention. The gimbal 200, for example, could be formed from copper layers or stainless steel, separated by a dielectric.

The specific head-gimbal assembly 260 shown is designed for a planar head 240 using a "bump die" where conductive pads are provided on a mounting surface of the head. It is expected that the head 240 would first be secured to the conductive pads 252 by applying heat from an opposite side of the gimbal 200 and that the resulting assembly 260 would the be flipped over and secured to the suspension terminals 153 on the underlying load beam 120'. The gimbal's transducer support surface 210, of course, could be modified to connect to other types of heads, as discussed below with respect to FIGS. 16, 17, and 18.

Figure 15A:
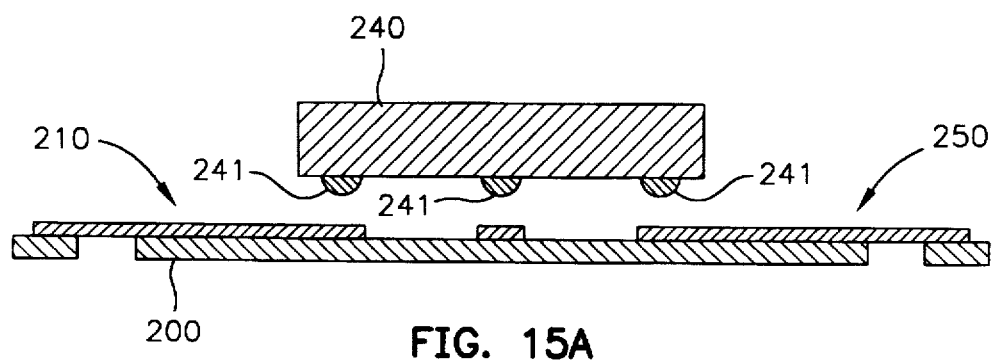
FIG. 15A is a cross-sectional view of the head-gimbal assembly 260 of FIG. 14 taken along section lines 15—15, showing a preferred construction of the gimbal 200.
Figure 15B:
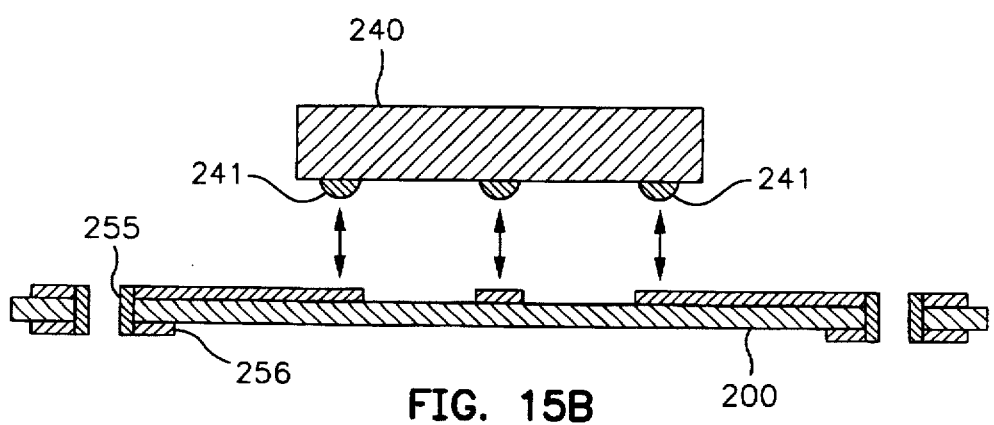
FIG. 15B is a cross-sectional view of the head-gimbal assembly 260 of FIG. 14 taken along section lines 15—15, showing an alternative construction of the gimbal 200.

The preferred conductive means 250 comprises copper traces 251 that are formed on the transducer support surface 210 and which extend along the flexible members 211, 212 between inner pads 252 and outer pads 253. The electrical connection, of course, must extend to the opposite side of the gimbal 200. As shown in FIG. 15B, a presently preferred way of achieving a connection from one side to the other comprises through holes or vias 255 in the outer pads 253 so that a conductive material, such as solder, may be flowed therein to form the electrical connection and, moreover, the reworkable, mechanical connection to the load beam 120' via the suspension terminals 153'. For example solder paste could be applied to the underside of the vias 255 and then heated to form a solder bump. The head gimbal assembly 260 would then be placed on the head gimbal flex circuit 150' on the load beam 120' so that the solder bumps align with the suspension terminals 153' and, by application of heat, reflowed to make the connection. It may be desirable to provide plated vias 255 in a manner well known in the field, in advance of applying the solder paste. It may also be desired to provide a bottom trace pad 256 in alignment with the outer pads 253, but on the suspension side of the gimbal 200, in order to enhance the quality of the connection. An alternative manner of achieving the connection is to remove only the polyimide layer from the suspension side of the gimbal assembly to expose the underside of the outer pads 253 as shown in FIG. 15A. This could be accomplished, for example, with a laser, wet etch, or plasma etching process.

When fully assembled, the underside of the transducer support surface 210 rests against a spherical load point 234 provided on a cross member 233 at the gimbal end of the load beam 130'. Because the preferred load beam 130' comprises injection molded plastic, the cross member 233 and spherical load point 234 may be molded-in features. The load point 234, however, could be formed in a stainless steel HGA by deforming a stainless steel member to form a bump, or in any other suitable manner.

As discussed above, the gimbal 200 may be attached to the planar head 240 to form a head-gimbal assembly 260 that is then assembled to the load beam 120'. Significantly, the head-gimbal assembly 260 may be attached to the load beam 120' without any interference from the head 240 because the gimbal 200 includes a outer band 220 which extends a short distance beyond the head 240 to fully expose the outer pads 253. It is anticipated that, in practice, a plurality of heads 240 and gimbal assemblies 200 would be assembled to one another by attaching heads 240 to an array of gimbals held by tabs in a larger sheet using an automated "pick and place" machine. The resulting head-gimbal assemblies 260 would then be detabbed for attachment to the head gimbal flex circuit 150' on the load beam 120' by gripping the head 240.

The gimbal 200 simplifies assembly and, just as significantly, makes it possible to repair a defective HSA or HGA by replacing only the head-gimbal assembly 260 while retaining the remainder of the HSA or HGA whenever possible. It is expected that the gimbal 200 will reduce the overall cost of production by providing for a faster, less expensive assembly process, by eliminating easily damaged trace extensions to reduce the likelihood of damage to materials during assembly, by providing for relatively quick and easy repair, and by minimizing the amount of materials which must be discarded during repair.

Figure 16:
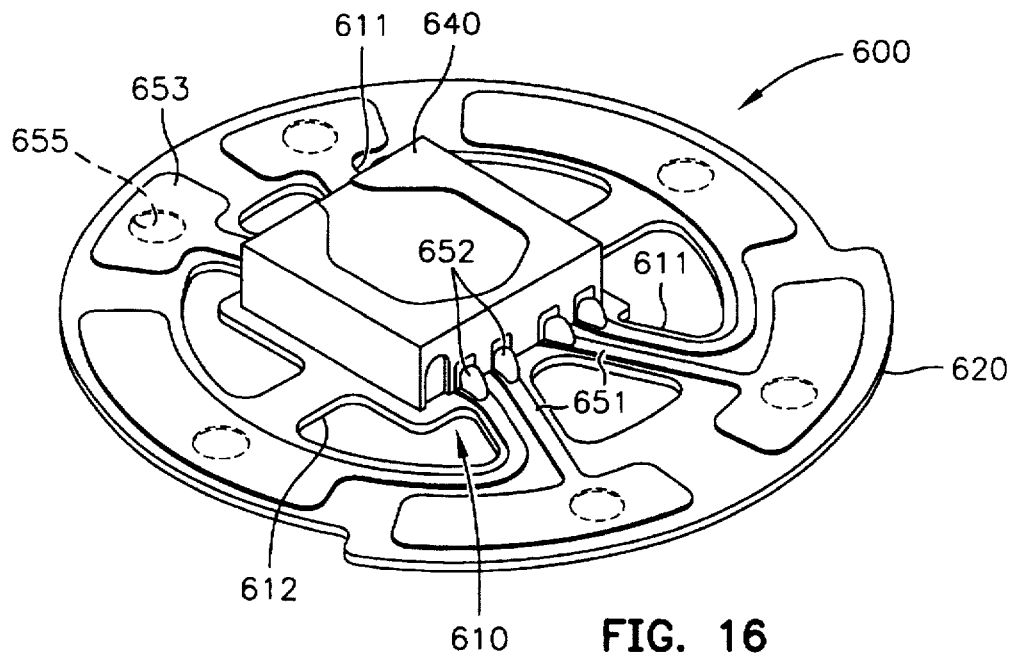
FIG. 16 is a perspective view which shows the construction of a second preferred gimbal 600 for use with a conventional transducer head 640.
Figure 17:
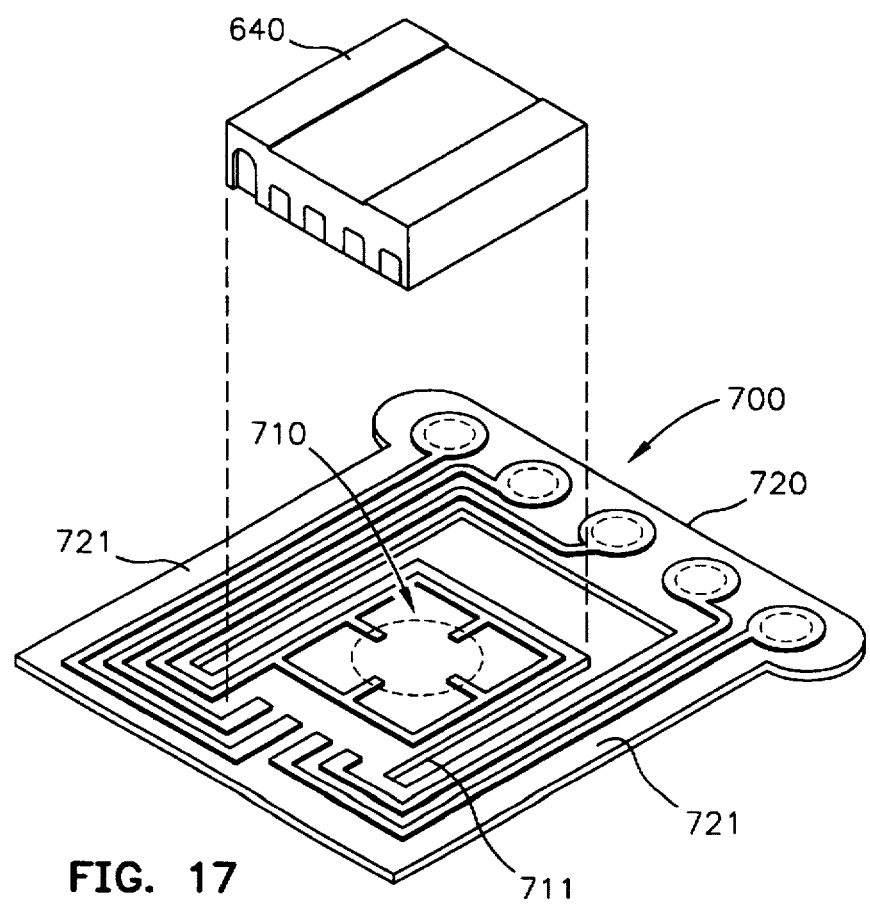
FIG. 17 is a perspective view which shows the construction of a third preferred gimbal 700 for use with a conventional transducer head 640.
Figure 18:
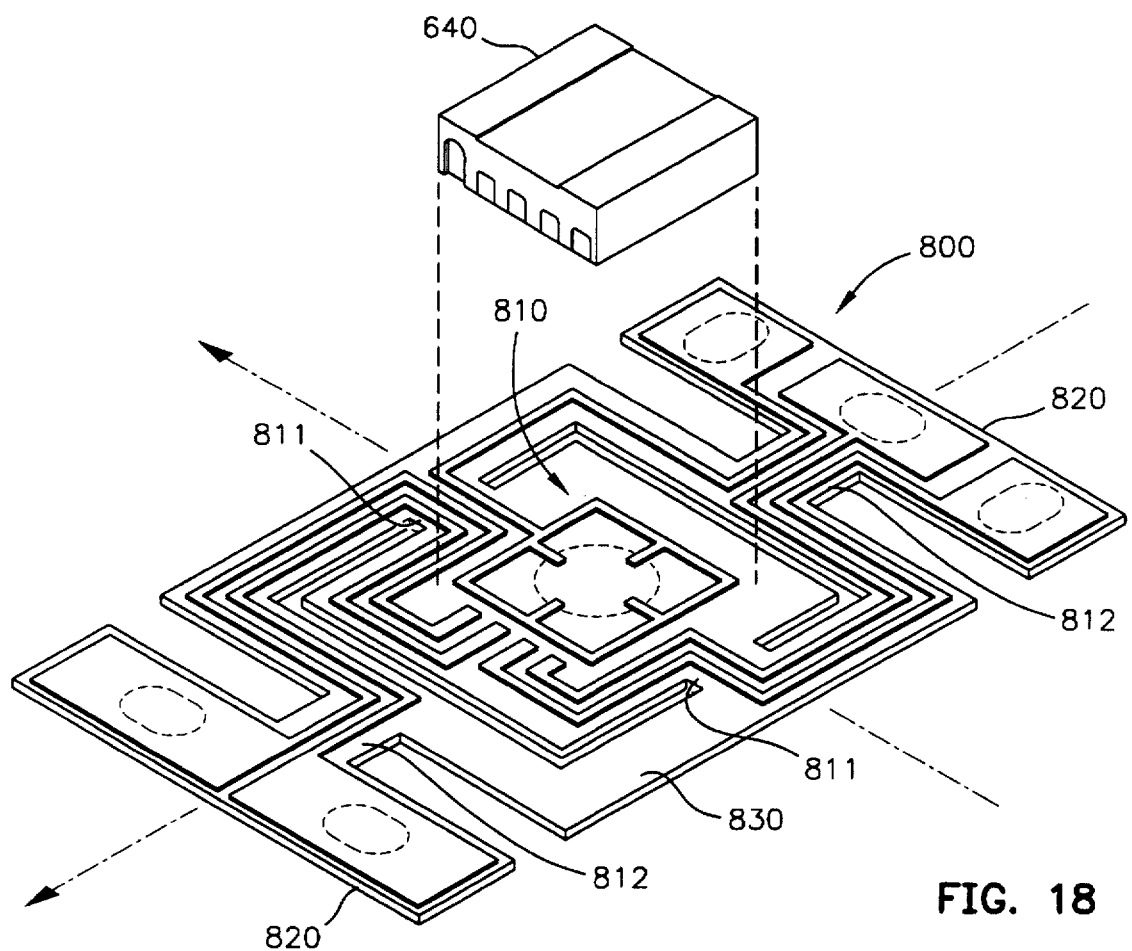
FIG. 18 is a perspective view which shows the construction of a fourth preferred gimbal 800 for use with a conventional transducer head 640.

As exemplified by FIGS. 16, 17, and 18, the central transducer support region 210 and the outer band 220 could, of course, be modified as respectively shown by transducer support regions 610, 710, and 810 and outer bands 620, 720, and 820 to connect to transducer heads and load beam circuits other than those shown in FIG. 14.

FIG. 16 shows a second preferred gimbal 600 that is similar to the gimbal 200 of FIG. 14 in that it comprises several flexible members 611, 612. Here however, the central transducer support region 610, its conductive traces 651, and its inner pads 652 have been modified to connect to a conventional transducer head 640 which has conductors on its edge. The embodiment shown in FIG. 16 preferably comprises a polyimide substrate and copper traces where holes 655 extending through the polyimide layer so that its outer pads 653 may be detachably secured to the load beam circuit in the same manner as the gimbal 200 of FIG. 14.

FIG. 17 shows a third preferred gimbal 700 that also mates with a conventional head 640. Here, however, its outer band 720 is rectangular to define a pair of legs 721 and its central transducer support region 710 comprises a tongue that connects to the outer band 720 via a single, flexible member 711. In this case, the inventors contemplate that the head 640 would be attached to the central transducer support region 710 with a small amount of conductive adhesive placed in the circular region indicated by dashed lines. The third preferred gimbal, like the others, preferably comprises a polyimide substrate which carries copper traces.

FIG. 18 shows a fourth preferred gimbal 800 that once again mates with the conventional transducer head 640. In this case, the outer band 820 comprises two discrete segments 820, 820 which connects to its central transducer support region 810 via two, perpendicular pairs of flexible members 811, 812. The inner flexible members 811 directly support the central transducer support region 810 and, being torsionally compliant, permit the support region to pivot about the axis identified with dashed lines and extending through the flexible members 811. The outer members 812 support an intermediate frame 830 and, also being torsionally compliant, permit the frame 830 and inner spokes 811 supported by the frame 830 to pivot about the axis identified with dashed lines and extending through the outer spokes 812. As with the embodiment of FIG. 17, the head 640 is preferably secured to the central transducer support region 810 via a conductive adhesive within the circular region identified with dashed lines. The conductive adhesive secures the head 640 and makes a conductive connection with the ground traces, not separately numbered, which extend within the circle.

The above disclosure has been provided to teach a swing-type actuator assembly having an actuator arm with internal conductors, a detachable press-fit means for connecting an HGA to an actuator arm, and a removable gimbal, each of which may be taken separately or in combination with cooperative components forming an actuator assembly, a head stack assembly, a head disk assembly, or overall disk drive to permit rapid assembly, reduce waste, and provide for relatively simple, cost effective repair.

We claim:

1. A head stack assembly for a magnetic disk drive comprising:

a molded actuator body having a pivot axis and an exterior surface defining a mounting site, the mounting site defining a plane substantially parallel to the pivot axis;

13 a flex circuit cable having a portion thereof supported on the mounting site;

a motive means for swinging the actuator body about the pivot axis;

an actuator arm cantilevered from the actuator body;

a head gimbal assembly cantilevered from the arm;

the head gimbal assembly including a head and an HGA electrical terminal electrically connected to the head;

the arm comprising a molded, elongated arm body;

a plurality of conductors, each conductor including a head-terminal defining an exterior surface of the arm body, a body-terminal, and defining a conductive path extending between the head-terminal and the body-terminal, each body terminal projecting from the mounting site and being electrically connected to the flex circuit cable;

the molded, elongated arm body and the molded actuator body completely covering each conductive path extending from the head-terminal to the body terminal, and further including means for electrically connecting the head-terminal to the HGA electrical terminal.

2. The head stack assembly of claim 1 wherein the motive means comprises a coil cantilevered from the actuator body to project in a direction radially away from the pivot axis.

3. The head stack assembly of claim 1 wherein the molded arm comprises glass-filled Polyphenylene Sulfide (PPS).

4. The head stack assembly of claim 1 wherein the molded arm body comprises:

an internal non-conductive island covering each section of the conductive path; and a conductive skin formed over the internal non-conductive island and connected to a ground for removing static charge from the molded arm body.

5. The head stack assembly of claim 4 wherein the conductive skin comprises carbon-filled Polyphenylene Sulfide (PPS).

6. The head stack assembly of claim 1 wherein the plurality of conductors comprise a lead frame.

7. The head stack assembly of claim 1 wherein the plurality of conductors are formed on a rigid substrate.

8. The head stack assembly of claim 7 wherein the rigid substrate is a printed circuit board.

9. The head stack assembly of claim 1 wherein the plurality of conductors are formed on a flexible substrate.

10. The head stack assembly of claim 9 wherein the flexible substrate is a polyimide sheet.

11. A magnetic disk drive having a disk and a head stack assembly including a swing-type actuator assembly, the head stack assembly comprising:

a molded actuator body having a pivot axis, and an exterior surface defining a mounting site, the mounting site defining a plane substantially parallel to the pivot axis;

a motive means for swinging the actuator body about the pivot axis;

an actuator arm cantilevered from the actuator body;

a head gimbal assembly cantilevered from the arm;

the head gimbal assembly including a head and an HGA electrical terminal electrically connected to the head;

a flex circuit cable having a portion thereof supported on the mounting site;

the arm comprising a molded elongated arm body;

a plurality of conductors, each conductor including a head-terminal defining an exterior surface of the arm

14 body, a body-terminal, and defining a conductive path extending between the head-terminal and the body-terminal, each body terminal projecting from the mounting site and being electrically connected to the flex circuit cable;

the molded elongated arm body and the molded actuator body completely covering each conductive path extending from the head-terminal to the body terminal, and further including means for electrically connecting the head-terminal to the HGA electrical terminal.

12. The magnetic disk drive of claim 11 wherein the motive means comprises a coil cantilevered from the actuator body to project in a direction radially away from the pivot axis.

13. The magnetic disk drive of claim 11 wherein the molded arm body comprises glass-filled Polyphenylene Sulfide (PPS).

14. The magnetic disk drive of claim 11 wherein the molded arm body comprises:

an internal non-conductive island covering the section of the conductive path; and a conductive skin formed over the internal non-conductive island and connected to a ground for removing static charge from the molded arm body.

15. The magnetic disk drive of claim 14 wherein the conductive skin comprises carbon-filled Polyphenylene Sulfide (PPS).

16. The magnetic disk drive of claim 11 wherein the plurality of conductors comprise a lead frame.

17. The magnetic disk drive of claim 11 wherein the plurality of conductors are formed on a rigid substrate.

18. The magnetic disk drive of claim 17 wherein the rigid substrate is a printed circuit board.

19. The magnetic disk drive of claim 11 wherein the plurality of conductors are formed on a flexible substrate.

20. The magnetic disk drive of claim 19 wherein the flexible substrate is a polyimide sheet.

21. A method of making a head stack assembly for a magnetic disk drive, the method comprising:

providing a flex circuit assembly;

providing a head gimbal assembly;

providing a plurality of conductors, each conductor having a head-terminal and a body-terminal and defining a conductive path extending between the head terminal and the body terminal for electrically connecting the head gimbal assembly to the flex circuit assembly;

molding an elongated arm body and an actuator body over each conductive path such that the head terminal defines an exterior surface of the molded arm body and the body terminal defines an exterior surface of the molded actuator body;

electrically connecting the head-terminal of the plurality of conductors to the head gimbal assembly; and electrically connecting the body-terminal of the plurality of conductors to the flex circuit assembly.

22. The method of claim 21 wherein the plurality of conductors comprises a lead frame and wherein the arm body molding step comprises the further step of molding a lead frame island on the lead frame for supporting the lead frame while molding the arm body over the lead frame.

23. The method of claim 21 wherein the arm body molding step comprises the further step of molding a non-conductive island over the plurality of conductors.

24. The method of claim 23 wherein the arm body molding step comprises a plurality of discrete, non-conductive islands and the further step of molding a nonconductive skin over the plurality of discrete, non-conductive islands.

25. The method of claim 23 wherein the arm body molding step comprises the further steps of molding a non-conductive island over the plurality of conductors and then molding a conductive skin over the non-conductive island for removing static charge from the arm body.

26. A method of making a head stack assembly for a magnetic disk drive, the method comprising:

providing a flex circuit assembly;

providing a head gimbal assembly;

providing a lead frame having a plurality of conductors, each conductor having a head-terminal and a body-terminal and defining a conductive path extending between the head terminal and the body terminal for electrically connecting the head gimbal assembly to the flex circuit assembly;

molding a non-conductive lead frame island on the lead frame for supporting the lead frame;

molding an elongated arm body and an actuator body over each conductive path and lead frame island such that the head terminal defines an exterior surface of the molded arm body and the body terminal defines an exterior surface of the molded actuator body;

electrically connecting the head-terminal to the head gimbal assembly; and electrically connecting the body-terminal to the flex circuit assembly.

27. The method of claim 26 comprising a plurality of discrete, non-conductive lead frame islands and wherein the arm body is also non-conductive.

28. The method of claim 26 comprising a single, non-conductive lead frame island and wherein the arm body is conductive for removing static charge from the arm body.

* * * * *